Oct. 7, 1969　　　A. GODDARD　　　3,470,984
SLIDING CALIPER DISC BRAKE STRUCTURE
Filed Oct. 5, 1967　　　3 Sheets-Sheet 3
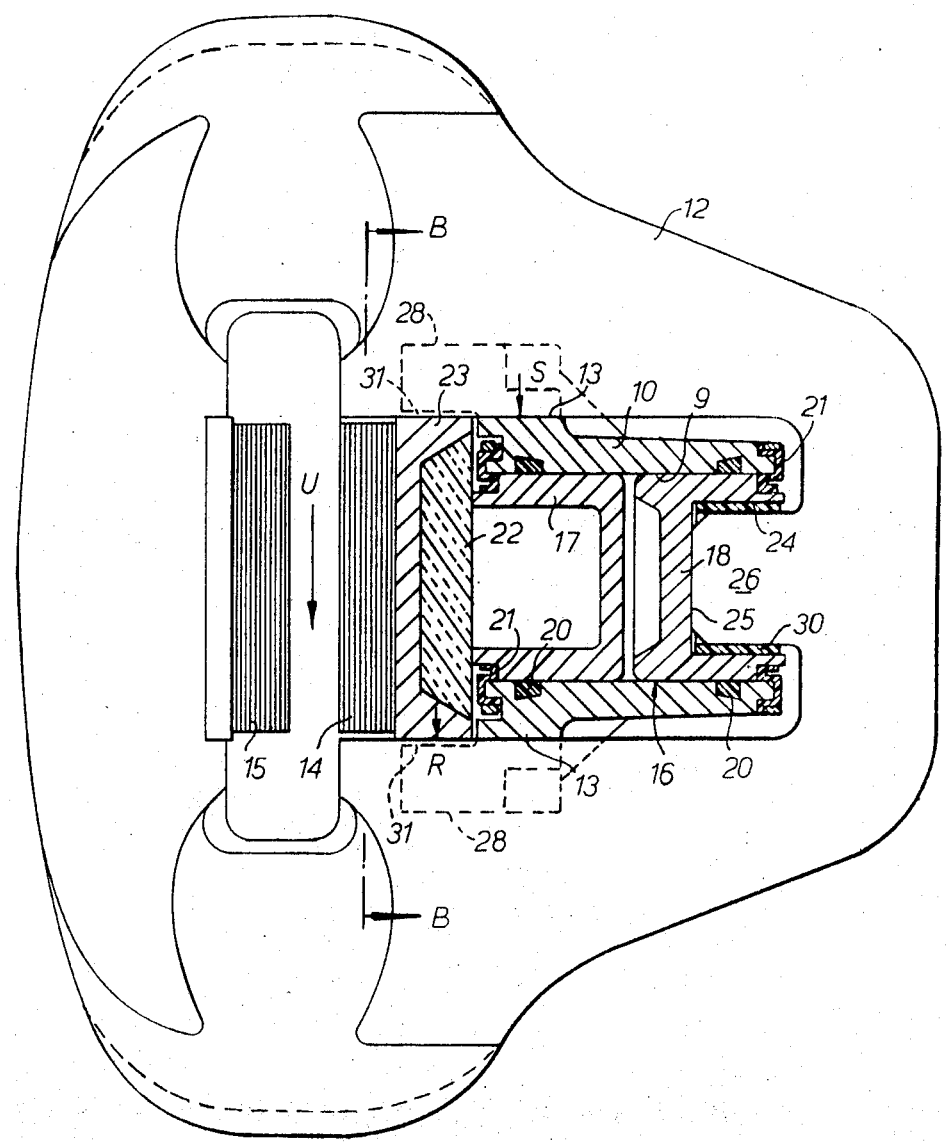
-FIG.3-

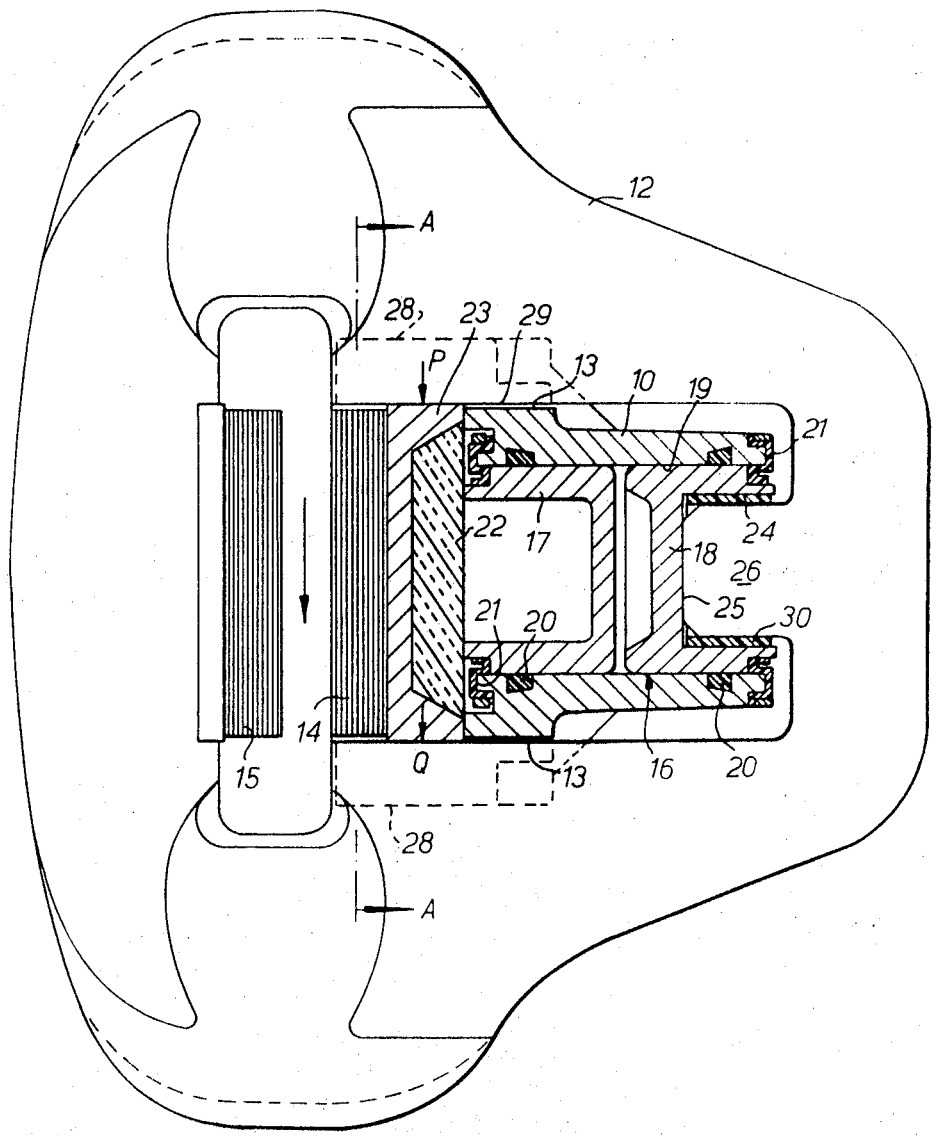
-FIG.1.-

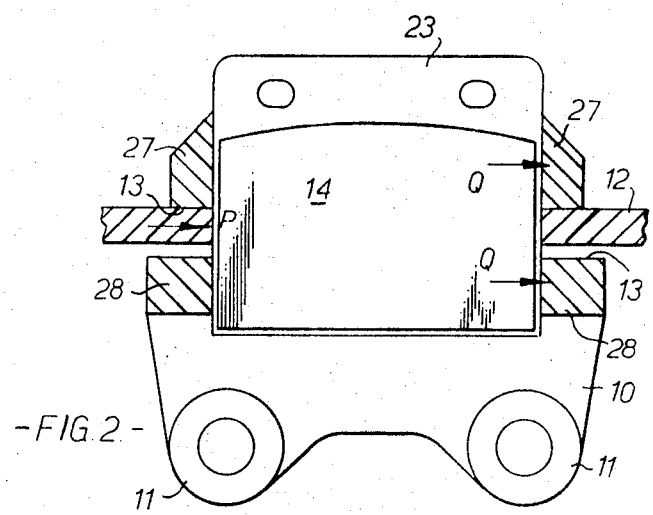
-FIG. 2.-
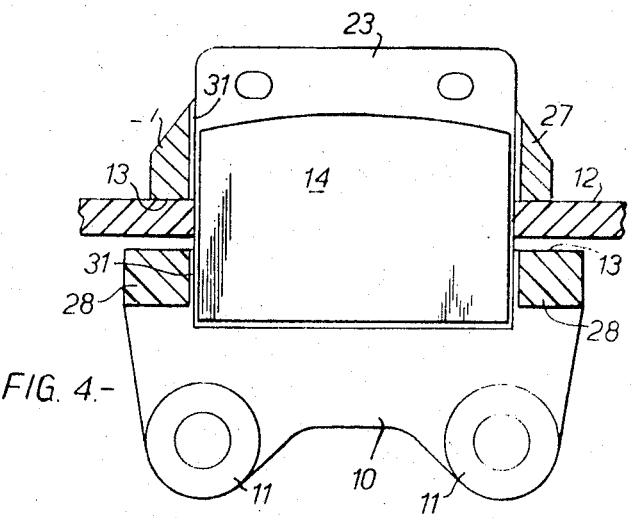
FIG. 4.-

United States Patent Office 3,470,984
Patented Oct. 7, 1969

3,470,984
SLIDING CALIPER DISC BRAKE STRUCTURE
Arthur Goddard, Knowle, England, assignor to Girling Limited, Tyseley, Birmingham, England
Filed Oct. 5, 1967, Ser. No. 673,064
Claims priority, application Great Britain, Oct. 8, 1966, 45,069/66
Int. Cl. F16d 55/10
U.S. Cl. 188—73                                    4 Claims

ABSTRACT OF THE DISCLOSURE

The invention provides a disc brake comprising a body member supporting a directly operated pad, a yoke slidably mounted on the body member and supporting an indirectly operated member and an actuator operative between the directly operated pad and the yoke. In one case the yoke always has lateral clearance from the body member so that the drag force from the indirectly operated pad is transferred by the yoke to the directly operated pad and the latter transfers the drag forces from both pads to the body member. In another case the directly operated pad always has lateral clearance in the body member so that the yoke receives the drag forces from both pads and transfers both drag forces to the body member.

---

The present invention relates to a disc brake comprising a body member adapted to support a directly operated brake pad, a yoke slidably mounted in grooves along opposite sides of the body member and adapted to support an indirectly operated brake pad opposed to said directly operated pad and an actuator in the body member and operative between the yoke and the directly operated pad.

An object of the invention is to minimize the turning couple applied to the yoke by the brake drag forces.

According to the present invention, the brake drag forces from both pads are transferred to the body member either by the directly operated pad or by the yoke. In the former case the yoke always has lateral clearance with respect to the body member and the drag force from the indirectly operated pad is transferred by the yoke to the directly operated pad. In the latter case the directly operated pad always has lateral clearance in the body member and the drag force from the directly operated pad is received by the yoke.

The invention will be further described, by way of example, with reference to the accompanying drawings, in which:

FIG. 1 is a sectional plan view of a first embodiment of disc brake in accordance with the invention;

FIG. 2 is a section on the line A—A of FIG. 1; and

FIGS. 3 and 4 are similar views of a second embodiment of disc brake, FIG. 4 being a section on the line B—B of FIG. 3.

Referring now to FIGS. 1 and 2, a spot type disc brake comprises a body member 10 adapted to be rigidly fixed by mounting lugs 11 to a fixed part of the vehicle to which the brake is to be applied. A yoke 12 is slidably mounted in grooves 13 along opposite sides of the body member. A directly operated pad 14 is supported on the body member whilst an indirectly operated pad 15 is supported on the yoke opposite to the pad 14. A hydraulic actuator 16 in the body member 10 is operative between the directly operated pad 14 and the yoke. The actuator 16 comprises a pair of opposed pistons 17 and 18 slidable in a through bore 19 in the body member and sealed thereto by sealing rings 20. Rubber boots 21 protect the bore 19 from dirt. The piston 17 acts against a heat barrier 22 in the rear face of the backplate 23 of the directly operated pad 14. The piston 18 has a counterbore 24 whose base 25 engages a tongue 26 on the yoke.

The backplate 23 of the pad 14 is located in the body member 10 by lugs 27 and 28 on the front end of the body member above and below the yoke 12. The backplate 23 has limited clearance between the lugs 27 and 28 and also has limited clearance between the inner side edges of the yoke, such clearance not being shown in the drawings. However there is always clearance as shown at 29 in FIG. 1, between the bases of the grooves 13 in the body member and the inner side edges of the yoke. Thus when the brake is applied, the disc rotating in the direction of the arrow U, the drag force from the indirectly operated pad 15 is transferred by the yoke to the backplate of the directly operated pad 14 as indicated by the arrows P in FIGS. 1 and 2. The drag forces from both pads are applied through the backplate 23 to the lugs 27 and 28 on one side of the body member as indicated by the arrows Q in FIGS. 1 and 2.

Turning of the yoke is restricted by the tongue 26 which is located in the piston 18 by a suitable insert member 30.

In the brake of FIGS. 3 and 4 parts like those in the embodiment of FIGS. 1 and 2 are denoted by like reference numerals. The brake of FIGS. 3 and 4 differs from that in FIGS. 1 and 2 in that there is limited clearance between the inner side edges of the yoke 12 and the bottoms of the grooves 13 and between these inner side edges and the backplate 23 of the directly operated pad 14, such limited clearances not being shown in the drawings. However there is always a clearance 31 between the sides of the backplate 23 and the lugs 27 and 28 on the body member. The drag force from the directly operated pad 14 is transferred by its backplate 23 to the yoke 12 as indicated by the arrow R in FIG. 3. The drag forces from both pads are then transferred by the yoke to the body member at the base of one of the grooves 13 as shown by the arrow S in FIG. 3

The embodiment of FIGS. 3 and 4 has the advantage over the embodiment of FIGS. 1 and 2 that the lugs 27 and 28 do not have to be dimensioned to withstand the drag forces.

I claim:

1. A disc brake comprising a body member, a directly operated pad located adjacent said body member, said body member having grooves along opposite sides thereof, a yoke having opposed inward side edges located for longitudinal movement in said grooves, an indirectly operated pad supported on said yoke opposed to said directly operated pad, an actuator in said body member and operative between said yoke and said directly operated pad, surface means on said directly operated pad engaged by said yoke for transferring to said directly operated pad the drag force developed at said indirectly operated pad, and surface means on said body member for receiving from said directly operated pad the brake drag forces developed at both said pads, said yoke being so dimensioned that it always has clearance with respect to the bases of said grooves whereby both said brake drag forces are applied to said body member at a common locality.

2. A disc brake according to claim 1 in which said body member includes lugs at opposite sides thereof, said surface means on said body member comprising opposed inward surfaces on forwardly projecting portions of said lugs and said directly operated pad having a backplate located between said lug inward surfaces and also between said yoke inward side edges.

3. A disc brake according to claim 1 in which said body member has a through bore and said actuator comprises opposed pistons slidably in said through bore in said body member, one of said pistons acting on said yoke and the other of said pistons acting on said directly operated pad.

4. A disc brake according to claim 3 in which said yoke has a tongue thereon, said tongue being located in said one piston.

References Cited

UNITED STATES PATENTS

| | | | |
|---|---|---|---|
| 3,166,156 | 1/1965 | Burnett et al. | 188—73 |
| 3,207,268 | 9/1965 | Mossey. | |
| 3,245,500 | 4/1966 | Hambling et al. | |
| 3,334,708 | 8/1967 | Swift | 188—73 |

GEORGE E. A. HALVOSA, Primary Examiner